United States Patent [19]

Sherwin et al.

[11] Patent Number: 4,869,889

[45] Date of Patent: Sep. 26, 1989

[54] PROCESS FOR THE PRODUCTION OF HYDROGEN CYANIDE

[75] Inventors: Martin B. Sherwin, Potomac; Jow-Lih Su, Silver Spring, both of Md.

[73] Assignee: W. R. Grace & Co.-Conn., New York, N.Y.

[21] Appl. No.: 327,633

[22] Filed: Mar. 23, 1989

[51] Int. Cl.$^4$ ................................................ C01C 3/02
[52] U.S. Cl. ...................................... 423/373; 423/376
[58] Field of Search .................................. 423/373, 376

[56] References Cited

U.S. PATENT DOCUMENTS

| | | | |
|---|---|---|---|
| 1,920,795 | 8/1933 | Jaeger | 423/373 |
| 1,934,838 | 11/1933 | Andrussow | 423/376 |
| 2,604,380 | 7/1952 | Beekhuis | 423/373 |
| 3,702,887 | 11/1972 | Sennewald et al. | 423/373 |
| 3,911,089 | 10/1975 | Shiraishi et al. | 423/376 |
| 4,511,548 | 4/1985 | Attig et al. | 423/376 |
| 4,536,483 | 8/1985 | Sasaki et al. | 423/376 |
| 4,745,207 | 5/1988 | Brunnmueller et al. | 423/373 |

FOREIGN PATENT DOCUMENTS 718112 11/1954 United Kingdom .
913836 12/1962 United Kingdom .

*Primary Examiner*—John Doll
*Assistant Examiner*—Wayne A. Langel
*Attorney, Agent, or Firm*—James P. Barr

[57] ABSTRACT

A process for the production of hydrogen cyanide which comprises combining methanol ammoxidation with formamide decomposition in the same reactor, using a metal oxide catalyst. This process generally involves forming a gaseous reaction mixture comprising methanol, formamide, ammonia, oxygen and optionally formaldehyde. This reaction mixture is then passed over the metal oxide catalyst at a temperature in the range 200° to 600° and a pressure in the range 5 to 20 psig.

18 Claims, No Drawings

PROCESS FOR THE PRODUCTION OF HYDROGEN CYANIDE

BACKGROUND OF THE INVENTION

1. Field of the Invention

This invention relates to a process for the production of hydrogen cyanide, and more specifically to a process wherein the reactions of methanol ammoxidation and formamide decomposition are combined simultaneously over a suitable metal oxide catalyst.

2. Description of the Prior Art

It is known in the prior art that hydrogen cyanide can be produced by the co-oxidation of ammonia and methane. More commonly known as the "Andrussow Process," the reaction can be described as:

$$CH_4 + NH_3 + 1.5O_2 \rightarrow HCN + 3 H_2O.$$

Despite being one of the major commercial routes to forming hydrogen cyanide, there are certain disadvantages to this process. Due to exothermicity and explosion limits of this reaction, the concentration of the reactants must be kept relatively dilute to avoid overheating the reactor which results in a low product concentration in the reactor off-gas stream. Since the off-gas stream is dilute in hydogen cyanide, large reactors and extensive downstream recovery equipment designed to handle large volumes of gas are required. Another disadvanage of this process is that the reaction must be run at high temperatures, in the range of 1000° to 1200° C., which are undesirable on an industrial scale, since this requires very lengthy heat-up and cool-down times. And finally there is a low ammonia conversion of typically 70% per pass, which requires recovery of the unreacted ammonia for process economy and also to avoid dangerous exothermic polymerization of the liquid hydrogen cyanide.

Other methods to produce hydrogen cyanide include the co-oxidation of ammonia with either methanol or formaldehyde over various catalysts. Suitable catalysts include antimony tetroxide, stannous oxide, and mixtures thereof, ferric molybdate, or other catalyst systems. This reaction has an advantage over the Andrussow process in that it only requires temperatures in the range of 300° to 500° C. to proceed. However, this reaction is also highly exothermic, and as in the Andrussow process, it requires that the concentration of rectants be kept relatively dilute to avoid overheating the reactor.

Another process for the manufacture of hydrogen cyanide involves formamide cleavage under reduced pressure and at elevated temperatures. The reaction may be written as follows:

$$HCONH_2 \rightleftharpoons HCN + H_2O.$$

A disavantage of this process is the endothermic nature of the reaction which requires an external source of heat to maintain the necessary reaction conditions. A further disadvantage of this process is that the reaction is equilibrium limited and therefore requires a reduced presasure (partial vacuum) to drive the reaction toward completion. The reactor off-gas then needs to be repressurized for downstream processing.

OBJECTS OF THE INVENTION

An object of this invention is to provide a new and improved process for the production of hydrogen cyanide in high yields.

A further object is to provide a process for the production of hydrogen cyanide in high product concentrations by combining the exothermic ammoxidation of methanol with the endothermic decomposition of formamide in the same reactor over a metal oxide catalyst. The process of this invention offers improved yields and higher product concentrations over prior art processes and fewer engineering requirements than existing hydrogen cyanide production.

We have found that by combining the exothermic methanol ammoxidation with the endothermic formamide decomposition and controlling the relative molar amounts of these reactants, the heat transfer requirements can be substantially reduced or eliminated, thus reducing reactor costs. Also, by reducing the heat of reaction, it is now possible to increase the reactant concentrations thereby increasing the downstream product concentration. This would also significantly reduce the capital requirement. This process has the further advantage of eliminating the reduced pressure requirements of the formamide decomposition process. That is, due to the equilibrium limitations of the decomposition of formamide reaction, the process is normally conducted under a vacuum. It has been discovered that under the process of this invention, by diluting the formamide decomposition with the simultaneous ammoxidation of methanol, the partial pressure of formamide is reduced and essentially the same effect as a vacuum is achieved. Thus, the need for the additional engineering consideration for vacuum is obviated.

Another object of this invention is to utilize as a source of methanol and formamide reactants, the crude, unpurified product stream from a formamide production reactor.

These and other objects will be apparent from the remaining specification and the appended claims.

DETAILED DESCRIPTION

The present invention is directed to a process of readily providing hydrogen cyanide in high yields and high product concentrations. The process of the present invention is based on the discovery that methanol ammoxidation can be combined with formamide decomposition in the same reactor, over a suitable metal oxide catalyst, to produce hydrogen cyanide.

Under the process of this invention, methanol and formamide are vaporized and mixed with ammonia and oxygen to form a gaseous reaction mixture. This reaction mixture is then passed through a reactor containing a suitable metal oxide catalyst at a temperature in the range 200° to 600° C. and preferably in the range 300° to 500° C., and at a pressure in the range 5 to 20 psig and preferably in the range 5 to 10 psig to form hydrogen cyanide. The molar ratio of methanol to formamide is in the range 1:(0.5–10) and is preferably in the range 1:(1–4). The amounts of ammonia and oxygen added to the reactor are in subtantially stoichiometric molar amounts. Under the process of this invention, the reaction mixture may optionally contain formaldehyde. Due to the ability of formaldehyde to undergo ammoxidation under the same reactive conditions as methanol, it is possible to substitute formaldehyde for all or a portion of methanol. However, while formaldehyde ammoxidation is an exothermic reaction, the heat release is 50% less than that of methanol ammoxidation. Therefore, the relative molar amounts of formaldehyde to formamide must be adjusted to compensate for the lower exothermicity.

Suitable metal oxide catalysts for use in this invention include, but are not limited to, antimony tetroxide, ferric molybdate, bismuth molybdate, stannous oxide and the like, or mixtures thereof. The residence time of the reactants on the catalyst for fixed bed reactors is between 0.1 to 5 seconds and preferably between 0.2 to 2 seconds. Residence times are determined by dividing the volume of the reactor by the volume of the gaseous reaction mixture fed per second and are calculated based on the average reactor temperature. Fluidized bed reactors will have higher residence times.

The reaction may be carried out in the presence of suitable diluents such as nitrogen, and it is therefore possible to use air as the source of both oxygen and nitrogen.

Suitable reactors for use in this invention include, but are not limited to, fixed bed or fluidized bed reactors.

Under the process of this invention, a further advantage is the ability to use a crude, unpurified formamide reactor product stream as the source of both the formamide and methanol reactants. Since formamide is commercially produced from carbon monoxide and ammonia using methanol as an intermediate, the crude product contains a mixture of methanol and formamide. In accordance with this invention, this crude, unpurified formamide solution may be used as a reactant stream which, when subjected to the conditions of this invention, will produce hydrogen cyanide in high yield.

The specific conditions, concentration of reactants, and relative molar amounts of methanol, formaldehyde and formamide can vary widely and are not critical per se to the invention, provided that the amount of exothermic methanol and formaldehyde are balanced by an appropriate amount of endothermic formamide such that the temperature of the reactor does not exceed 600° C. It is essential to maintain the temperature of the reactor below 600° C. to avoid over-oxidation of the reactants which will result in the formation of carbon monoxide and carbon dioxide and a reduction in hydrogen cyanide yields.

Without further elaboration, it is believed that one skilled in the art, using the preceding description, can utilize the present invention to its fullest extent. The following examples are provided to illustrate the invention in accordance with the principles of this invention but are not to be construed as limiting the invention in any way except as indicated in the appended claims. All parts and percentages are by moles unless otherwise indicated. Since the temperature of the fixed bed reactor varied over its length, both the average temperature and the hot spot temperatures were reported. Residence times of the reactants on the catalyst were calculated using the average reactor temperature and reactor pressure.

EXAMPLE 1

Methanol and formamide were vaporized and mixed with ammonia, nitrogen and oxygen. This reaction mixture was passed through a tubular fixed bed reactor having a volume of 129 cm$^3$, packed with ferric molybdate catalyst under the following conditions:

|  | Experiment # | | | |
|---|---|---|---|---|
|  | 1 | 2 | 3 | 4 |
| Reaction Mixture Mole % | | | | |
| $CH_3OH$ | 4.6 | 6.2 | 5.8 | 7.0 |
| $NH_3$ | 4.6 | 6.2 | 5.8 | 7.0 |
| $O_2$ | 8.7 | 8.0 | 7.4 | 7.0 |
| $N_2$ | 78.4 | 72.0 | 72.2 | 62.3 |
| $HCONH_2$ | 3.7 | 7.5 | 14.7 | 16.4 |
| Total Reactant flow rate gram-mole/min | 0.187 | 0.138 | 0.150 | 0.159 |
| Average temp/°C. Hot Spot | 313/378 | 311/435 | 320/350 | 319/400 |
| Pressure (psig) | 12.5 | 9.0 | 9.0 | 14.0 |
| Residence time (sec) | 1.59 | 1.89 | 1.71 | 2.02 |
| HCN Yield % (based on $CH_3OH$ and $HCONH_2$) | 85.0 | 77.0 | 72.0 | 71.0 |
| HCN mole % in product | 6.6 | 9.2 | 12.3 | 13.4 |

EXAMPLE 2

The experiment as described in Example 1 was repeated except that the residence times over the catalysts were varied as indicated.

|  | Experiment # | | |
|---|---|---|---|
|  | 1 | 2 | 3 |
| Reaction Mixture Mole % | | | |
| $CH_3OH$ | 6.2 | 6.2 | 6.6 |
| $NH_3$ | 6.2 | 6.2 | 6.3 |
| $O_2$ | 7.9 | 8.0 | 8.0 |
| $N_2$ | 71.2 | 72.0 | 72.2 |
| $HCONH_2$ | 8.5 | 7.5 | 6.0 |
| Total Reactant flow rate gram-mole/min | 0.128 | 0.139 | 0.254 |
| Approx. Average temp/Hot Spot °C. | 323/447 | 310/460 | 310/450 |
| Pressure (psig) | 10.0 | 10.0 | 10.0 |
| Residence time (sec) | 1.9 | 0.63 | 0.32 |
| HCN Yield % (based on $CH_3OH$ & $HCONH_2$) | 80.6 | 79.2 | 86.6 |
| HCN mole % in product | 10.3 | 9.5 | 10.3 |

EXAMPLE 3

This example demonstrates the ability of formaldehyde and methanol to undergo ammoxidation under identical reaction conditions. Formaldehyde and methanol were vaporized and mixed with ammonia, nitrogen, oxygen and wate (in the form of steam). This reaction mixture was passed through a tubular fixed bed reactor having a volume of 129 cm$^3$, packed with a ferric molybdate catalyst under the following conditions:

|  | Experiment # | | | |
|---|---|---|---|---|
|  | 1 | 2 | 3 | 4 |
| Reaction Mixture mol % | | | | |
| $CH_2O$ | 4.45 | 5.94 | 6.69 | 8.00 |
| $CH_3OH$ | 1.13 | 1.51 | 1.69 | 2.03 |
| $NH_3$ | 8.62 | 8.91 | 10.02 | 9.79 |
| $H_2O$ | 10.62 | 14.23 | 15.98 | 19.10 |

-continued

| | Experiment # | | | |
|---|---|---|---|---|
| | 1 | 2 | 3 | 4 |
| $O_2$ | 7.52 | 6.94 | 6.56 | 6.11 |
| $N_2$ | 67.66 | 62.47 | 59.05 | 54.97 |
| Total reactant flow rate gram-mole/min | 0.163 | 0.176 | 0.187 | 0.200 |
| Residence Time, sec. | 1.64 | 1.51 | 1.39 | 1.36 |
| Pressure, psig | 10 | 10 | 10 | 10 |
| Reactor Temp, °C. Avg/Hot Spot | 318/420 | 321/476 | 337/487 | 307/553 |
| HCN Yields, % (based on combined $CH_2O$ & $CH_3OH$) | 86.3 | 92.3 | 93.5 | 70.8 |
| HCN mol % in Product | 4.7 | 6.6 | 7.5 | 6.7 |

What is claimed is:

1. A process for preparing hydrogen cyanide which comprises passing a gaseous reaction mixture of methanol, formamide, ammonia and oxygen under reactive conditions over a metal oxide catalyst.

2. The process according to claim 1 wherein the metal oxide catalyst is selected from the group of bismuth molybdate, ferric molybdate, stannous oxide, antimony tetroxide, and mixtures thereof.

3. The process according to claim 1 wherein the molar ratio of methanol to formamide is 1:(0.5–10).

4. The process according to claim 1 wherein the molar ratio of methanol to formamide is 1:(1–4).

5. The process according to claim 1 wherein the temperature is maintained in the range 200° to 600° C.

6. The process according to claim 1 wherein the temperature is maintained in the range of 310° to 460° C.

7. The process according to claim 1 wherein the residence time of the gaseous reaction mixture on the metal oxide catalyst is 0.1 to 5 seconds.

8. The process according to claim 1 wherein the residence time of the gaseous reaction mixture on the metal oxide catalyst is 0.2 to 2.0 seconds.

9. The process according to claim 1 wherein the source of methanol and formamide is a crude, unpurified product stream obtained from a formamide production reactor.

10. The process according to claim 1 wherein the pressure is maintained in the range 5 to 20 psig.

11. A process for the preparation of hydrogen cyanide which comprises passing a gaseous reaction mixture of methanol, formamide, ammonia and oxygen over a ferric molybdate catalyst at a temperature in the range 310° to 460° C., wherein the molar ratio of methanol to formamide is in the range 1:(1–4), and the residence time of the reaction mixture on the catalyst is in the range 0.2 to 1.0 seconds.

12. A process for the preparation of hydrogen cyanide which comprises passing a gaseous reaction mixture of methanol or formaldehyde or a mixture thereof, formamide, ammonia and oxygen under reactive conditions over a metal oxide catalyst.

13. The process according to claim 12 wherein the metal oxide catalyst is selected from the group of bismuth molybdate, ferric molybdate, stannous oxide, antimony tetroxide, and mixtures thereof.

14. The process according to claim 12 wherein the temperature is maintained in the range 200° to 600° C.

15. The process according to claim 12 wherein the residence time of the gaseous reaction mixture on the oxide molybdate catalyst is 0.1 to 5 seconds.

16. The process according to claim 12 wherein the molar ratios of methanol to formaldehyde to formamide are (0 to 1):(0 to 1):(0.5 to 10) and wherein the sum of the methanol and formaldehyde molar ratios totals 1.

17. The process according to claim 12 wherein the pressure is maintained in the range 5 to 20 psig.

18. A process for the preparation of hydrogen cyanide which comprises passing a gaseous reaction mixture of methanol or formaldehyde or a mixture thereof, formamide, ammonia and oxygen over a ferric molybdate catalyst at a temperature in the range 310° to 460° C., wherein the molar ratios of methanol to formaldehyde to formamide is in the range (0 to 1):(0 to 1):(0.5 to 10), and the sum of the methanol and formaldehyde molar ratios totals 1, and the residence time of the reaction mixture on the catalyst is in the range 0.2 to 1.0 seconds.

* * * * *